United States Patent [19]

Loeppert et al.

[11] Patent Number: 5,178,015
[45] Date of Patent: Jan. 12, 1993

[54] SILICON-ON-SILICON DIFFERENTIAL INPUT SENSORS

[75] Inventors: Peter V. Loeppert; Warren S. Graber, both of Rolling Meadows, Ill.

[73] Assignee: Monolithic Sensors Inc., Rolling Meadows, Ill.

[21] Appl. No.: 733,668

[22] Filed: Jul. 22, 1991

[51] Int. Cl.[5] .......................... G01L 7/08; G01L 9/12
[52] U.S. Cl. .................................. 73/718; 29/25.41; 73/724; 361/283
[58] Field of Search ................ 73/718, 724, 706, 708; 29/25.41, 25.01; 361/283

[56] References Cited

U.S. PATENT DOCUMENTS

| | | | |
|---|---|---|---|
| 4,543,457 | 9/1985 | Petersen | 200/83 N |
| 4,625,560 | 12/1986 | Sanders | 73/718 |
| 4,625,561 | 12/1986 | Mikkor | 73/724 |
| 4,701,424 | 10/1987 | Mikkor | 29/25.41 |
| 4,812,888 | 3/1989 | Blackburn | 357/26 |
| 4,814,845 | 3/1989 | Kurtz | 357/26 |
| 4,852,408 | 8/1989 | Sanders | 73/718 |
| 5,022,270 | 6/1991 | Rud, Jr. | 73/718 |

OTHER PUBLICATIONS

A CMOS Front-end circuit for a capacitive Pressure Sensor, pp. 102-107; Kjensmo.
A Capacitive Silicon Pressure Sensor with Low TCO and High Long-Term Stability, pp. 151-154, Hanneborg.
A Capacitive Pressure Sensor with Low Impedance Output and Active Suppression of Parasitic Effects, pp. 108-114, Puers.
A Computer-Aided Intrauterine Pressure Measurement System Based on a Silicon Sensor Element with Low Deflection, pp. 49-53, Ohlckers et al.
The Fabrication and Use of Micromachined, Corrugated Silicon Diaphragms Jerman.
Flat and Corrugated Diaphragm Design Handbook, pp. 207-210, Di Giovanni.

*Primary Examiner*—Donald O. Woodiel
*Attorney, Agent, or Firm*—Rockey, Rifkin and Ryther

[57] ABSTRACT

An improved diaphragm sensor employs silicon-on-silicon technology and has monolithic integrated signal conditioning circuitry. The support circuitry minimizes the effects of stray capacitance and may be configured to provide either analog or digital output to external terminals. It has a wide band of linearity and is particularly useful for accurately measuring pressures less than 0.5 PSI. The sensor is constructed by joining a silicon top plate having a mechanical pressure stop, a reduced thickness silicon diaphragm and a back plate having CMOS circuitry thereon. These components are bonded together by eutectic soldering.

10 Claims, 4 Drawing Sheets

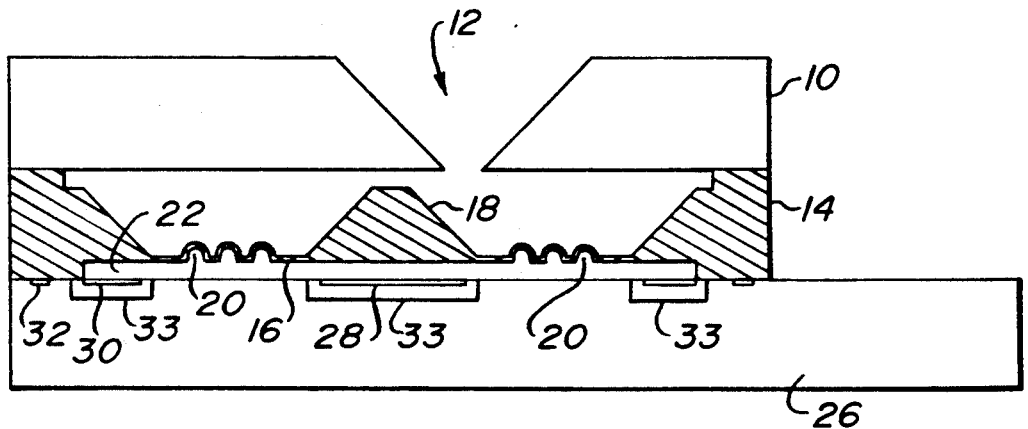
FIG. 1
FIG. 2
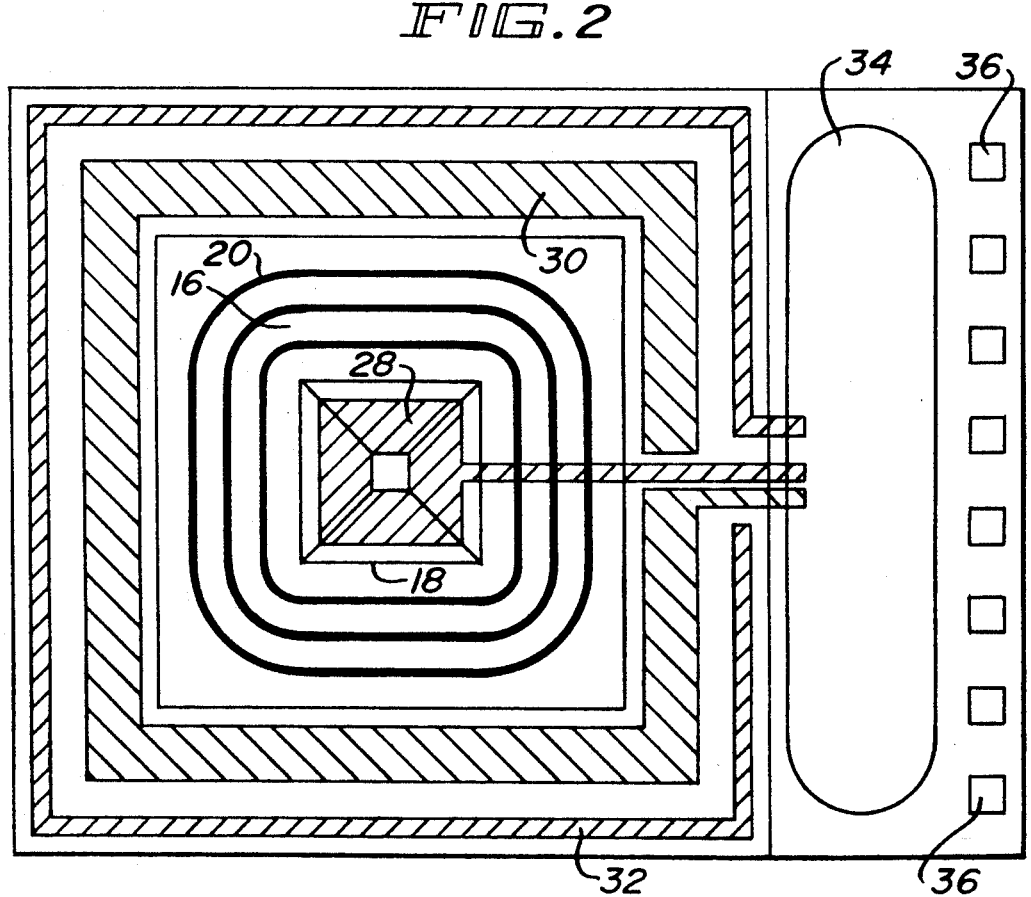

SILICON-ON-SILICON DIFFERENTIAL INPUT SENSORS

BACKGROUND AND OBJECTS OF THE INVENTION

The present invention relates to diaphragm pressure sensors, and more particularly, to silicon-on-silicon differential input sensors with integrated signal conditioning circuitry and the process for producing them.

Sensors having a reduced thickness silicon diaphragm affixed to a glass wafer are known in the art. U.S. Pat. No. 4,543,457 issued to Petersen et al. on Sep. 24, 1985 ("the Petersen patent") discloses such a sensor. Sensors of this type may be used to measure a variety of parameters, such as pressure, temperature, acceleration or humidity. Silicon diaphragm sensors are reliable and may be fabricated at low cost. The output of such a sensor changes as the diaphragm is deflected by the condition sought to be measured.

A particular type of sensor uses variable capacitance. In variable capacitance sensors, the diaphragm is spaced apart from a confronting electrical plate. The capacitance between the diaphragm and the confronting plate changes in response to the deflection of the diaphragm. The usefulness of a given sensor is determined in part by the range of conditions over which the change in capacitance remains linear with respect to the change in input condition. Superior performance has been obtained with diaphragms of corrugated and bossed construction. These diaphragms deflect while remaining substantially parallel with the confronting contact, minimizing the undesirable effects of diaphragm curvature on sensor accuracy. Corrugated diaphragms have much larger regions of linearity than diaphragms without corrugations.

A major difficulty with conventional silicon-on-glass sensors of the type shown in the prior art is the difference between the coefficients of thermal expansion of silicon and glass. The silicon diaphragms are typically bonded to glass wafers by electrostatic bonding methods. Sensor inaccuracies result due to temperature changes because the silicon diaphragm and the glass wafer have different coefficients of expansion. This affects the geometric configuration of the device, resulting in degraded measurement accuracy. This problem could be avoided by mounting the silicon diaphragm on a wafer of similar silicon material; however, stray capacitances are introduced into the system when the diaphragm is bonded to silicon material.

Such stray capacitances present serious problems because they obscure accurate measurement of the capacitance between the diaphragm and the confronting electrode on the silicon wafer, effectively rendering measurements from the sensor useless. Historically, the thermal expansion problem, which arises from mounting the silicon diaphragm on glass, has been perceived by those skilled in the art as the least troublesome of the two. On the other hand, if the stray capacitance problem could be solved, silicon-on-silicon configurations free from thermal expansion problems could be produced.

Another problem with the silicon-on-glass construction is that it precludes the use of on board, integrated electronics for converting the output of the sensor into meaningful form and transmitting it to external electrodes. Instead, the circuitry must be produced separately and affixed to the glass wafer at a later time. These "hybrid" sensors are costly and inefficient to manufacture. Prior attempts to create one-piece silicon-on-silicon sensors have failed because the micro-electronics operations necessary to deposit integrated circuitry on the silicon are incompatible with the process of micro-machining operations necessary to create the diaphragm. No suitable solution to these problems has heretofore been found.

Accordingly, it is an object of the invention to provide a silicon-on-silicon capacitive sensor.

It is another object of the invention to provide such a sensor having monolithic integrated circuitry.

It is a further object of the invention to provide such a sensor having durable construction and capable of being produced at low cost.

These and other objects of the invention will become apparent to those skilled in the art when the following detailed description of the invention is read in conjunction with the accompanying drawings.

SUMMARY OF THE INVENTION

The present invention is a silicon-on-silicon capacitive sensor with monolithic integrated signal conditioning circuitry. It overcomes the thermal mismatch problem that occurs when a reduced thickness silicon diaphragm is mounted on a glass back plate. The support circuitry is designed to minimize the undesirable effects of stray capacitance historically encountered in prior attempts to utilize silicon-on-silicon technology. The support circuitry ma be configured to provide either analog or digital outputs. The sensor may be used to measure a variety of parameters, such as pressure, acceleration, temperature or humidity. It has a wide band of linearity and is particularly useful for accurately measuring pressures less than 0.5 PSI.

The sensor of the present invention is constructed by bonding together three silicon components: (1) a top plate having a mechanical pressure stop, (2) a reduced thickness diaphragm and (3) back plate containing CMOS circuitry. The diaphragm and back plate have two sets of confronting electrodes. One set provides a reference capacitance and the other a variable capacitance dependent on the deflection of the diaphragm. The three components are produced separately, avoiding the historic problem of incompatibility between micromachining and CMOS processing, which has previously made monolithic integrated support circuitry impractical. The components are then bonded together by eutectic soldering.

BRIEF DESCRIPTION OF THE DRAWINGS

FIG. 1 is a cross-sectional side view of the capacitive sensor of the present invention.

FIG. 2 is a plan view in partial section of the capacitive sensor of the present invention.

DETAILED DESCRIPTION OF THE PREFERRED EMBODIMENT

Figure 3:
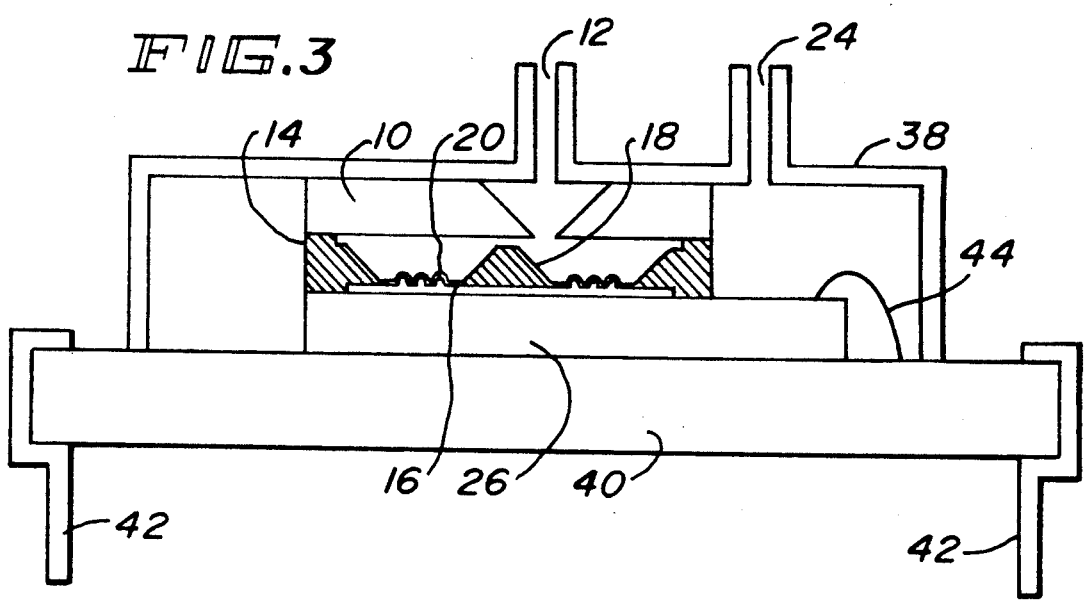
FIG. 3 is a side view in partial section of a fully assembled sensor constructed according to the teachings of the present invention.

Referring to the drawings, FIG. 1 shows a cross-sectional side view of the capacitive sensor of the present invention. A silicon top plate 10 provides a mechanical pressure stop that limits the travel of the diaphragm when the sensor is exposed to pressures beyond its measurement range. The top plate 10 also acts as a buffer against package-induced stress. A first fluid access port 12 is formed in the top plate 10 by anisotropic etching, a process well-known in the art.

A diaphragm ring 14 has a central portion defining a reduced-thickness silicon diaphragm 16. The diaphragm 16 is typically 800–1200 microns square. The diaphragm 16 includes a boss structure 18, which contributes to the linearity of the sensor by reducing curvature of the diaphragm as it travels responsive to the force being measured. The boss 18 is created by anisotropic etching of the diaphragm ring 14 and is typically 500–800 microns square at the bottom tapering to 50–80 microns square at the top. The boss 18 also prevents destruction of the diaphragm under transient conditions by abutting the top plate 10. Thus, movement of the diaphragm 16 is limited to the useful range of the sensor. It should be noted that the location of the port 12 is offset from the position where the boss 18 would strike the top plate 10 to prevent it from becoming lodged therein.

Additionally, the diaphragm 16 is constructed to include corrugations 20. As previously noted, corrugations contribute to the linearity of the sensor. They reduce stress on the diaphragm 16 as it is deflected. The corrugations 20 are created by isotropic etching and are typically 10 microns deep and 25 microns wide. The diaphragm ring 14 also has a uniform recess 22 etched therein. The upper surface of recess 22 forms one of the electrode surfaces for a reference capacitance, as well as contributing to the flexibility of the diaphragm 16. An etch stop is diffused (typically 2 microns deep) into the bottom of the diaphragm to set the thickness of the reduced-thickness portion of the diaphragm. A P+ etch stop may be used; however, a lightly doped N-type electromechanical etch stop is preferred to preserve the well-behaved, low-stress nature of the bulk silicon.

The diaphragm 16 has a second fluid access port etched therein. The second port permits pressure equalization on both sides of the diaphragm. Thus, the measurements made by the sensor reflect the difference between the pressure source presented to the first port 12 and the second port. The top plate 10 is eutectically soldered to the diaphragm 14.

The diaphragm ring 14 is eutectically soldered to a back plate 26. The back plate 26 has a conductive pad 28 deposited thereon directly beneath the boss 18 to form a measurement capacitor in combination with the underside of diaphragm 16. The capacitance of the measurement capacitor changes as the diaphragm flexes responsive to the pressure differential provided to the first and second ports.

A second conductive pad 30 is deposited on the upper surface of the back plate 26 to create a reference capacitor when brought into confrontation with the underside of the diaphragm ring 14 exposed by the formation of the recess 22. The capacitance of the reference capacitor remains constant during operation of the sensor because this portion of the diaphragm ring remains at a fixed distance from the conductive pad 30.

A third conductive pad 32 (see FIG. 2) is deposited on the back plate 26 to act as a common terminal for the reference capacitor and the measurement capacitor. As will be apparent to those skilled in the art, the entire diaphragm ring 14 is conductive, thereby providing a common conductive surface for both the reference and measurement capacitors. The third conductive pad 32 electrically connects the ring 14 to the integrated signal conditioning circuitry, as will be fully described hereinafter.

FIG. 2 shows a plan view of the capacitive sensor of the present invention in partial section. The layout of the conductive pads 28, 30 and 32 may be clearly seen. The back plate 26 has an area 34 onto which integrated signal conditioning circuitry may be deposited. Inputs and outputs from this circuitry are electrically connected to a plurality of bond pads 36. The bond pads 36 may be connected to external leads by conventional wire bonding methods.

FIG. 3 shows a side view in partial section of a fully assembled sensor. A plastic housing 38 encloses the sensor assembly, providing openings for the first port 12 and the second port 24. The sensor assembly is secured to a base 40 having a plurality of external leads 42 mounted thereto. Wire bonds 44 connect the external leads 42 to the bond pads 36, effectively providing external access to the output from the signal conditioning circuitry.

A significant aspect of the present invention is the design of the integrated signal conditioning circuitry. The diaphragm has been designed such that its deflection is linear with the sensor input. This results in the measured capacitance $C_{meas}$ varying inversely with the sensor input. The object of the integrated circuitry is to generate an output directly proportional to the ratio of the reference capacitance to the measured capacitance and thus is directly proportional to the sensor input. Including the reference capacitance in the ratio cancels the effects of process variations on the gap between the capacitor plates and the variation of the dielectric constant of the fluid between the capacitor plates. A second object of the circuitry is to minimize the effects of stray capacitance introduced between each of the capacitor plates and the substrate which are introduced by the silicon on silicon technology. A constraint that the circuits must meet is that the diaphragm serves as a common terminal to both capacitors.

Figure 4:
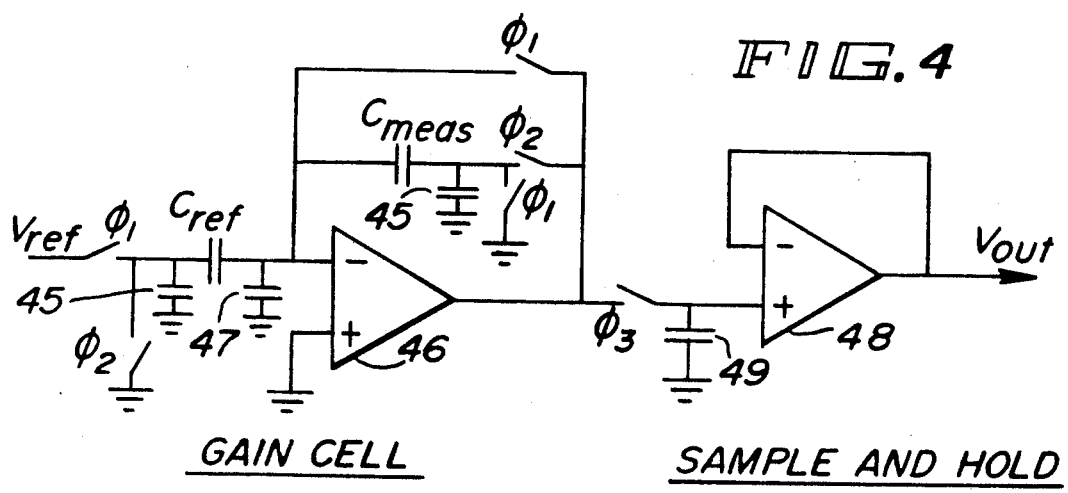
FIG. 4 is a schematic drawing of a first embodiment of integrated analog signal conditioning circuitry which may be deposited on the CMOS back plate of the present invention.

FIG. 4 shows an example of a switched capacitor analog signal conditioning circuit suitable for use with the sensor of the present invention. This circuit uses a switched capacitor gain cell to amplify a known dc input voltage $V_{ref}$ so that the output of the circuit $V_{out}$, after sampling at the second stage, varies proportionally with the ratio of the reference capacitance $C_{ref}$ to the measured capacitance $C_{meas}$. $C_{ref}$ is the fixed capacitance between the second conductive pad 30 and the portion of the diaphragm ring 14 exposed by the recess 22 (see FIG. 1). $C_{meas}$ is the capacitance between the first conductive pad 28 and the diaphragm 16. As previously described, this capacitance varies as the diaphragm 16 deforms responsive to the condition being measured.

Figure 4A:
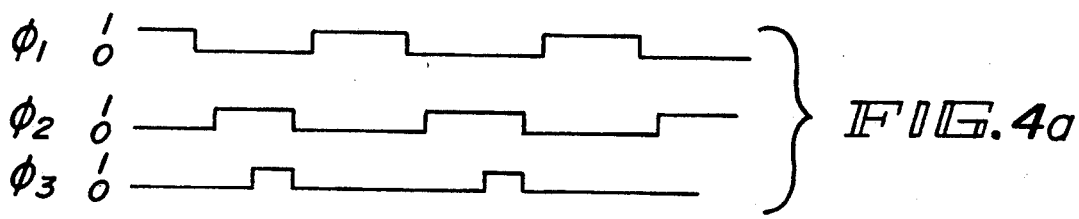
FIG. 4a is a timing diagram showing various signals associated with the circuit of FIG. 4.

The circuit of FIG. 4 is preferably implemented in CMOS technology where the switches will be simple complementary transistor pairs. The switches are turned on and off periodically as indicated in FIG. 4a. A logical 1 in FIG. 4a indicates that the associated switches are closed. $\phi_1$ and $\phi_2$ are non-overlapping waveforms of a two phase clock. Operation of the gain cell with this clock effects multiplication of $V_{ref}$ by the ratio of $C_{ref}$ to $C_{meas}$. Clock signal $\phi_3$ samples the output from operational amplifier 46. The sample is held by capacitor 49 and $V_{out}$ is buffered by operational amplifier 48.

Stray or parasitic capacitances 45 and 47 are introduced into the circuit because of the use of silicon in the construction of the diaphragm ring 14 and the CMOS back plate 26. The exact values of the stray capacitances 45 and 47 are difficult to determine with any precision, but are large compared to $C_{ref}$ and $C_{meas}$. The topology of the circuit of FIG. 4 forces the stray capacitances 45 to low impedance nodes where their effect on the output is minimized. The stray capacitance 47 is connected to a virtual ground and its effective value is reduced by a factor equal to the open loop gain of the operational amplifier 46, thus minimizing its effect on the output.

Figure 5:
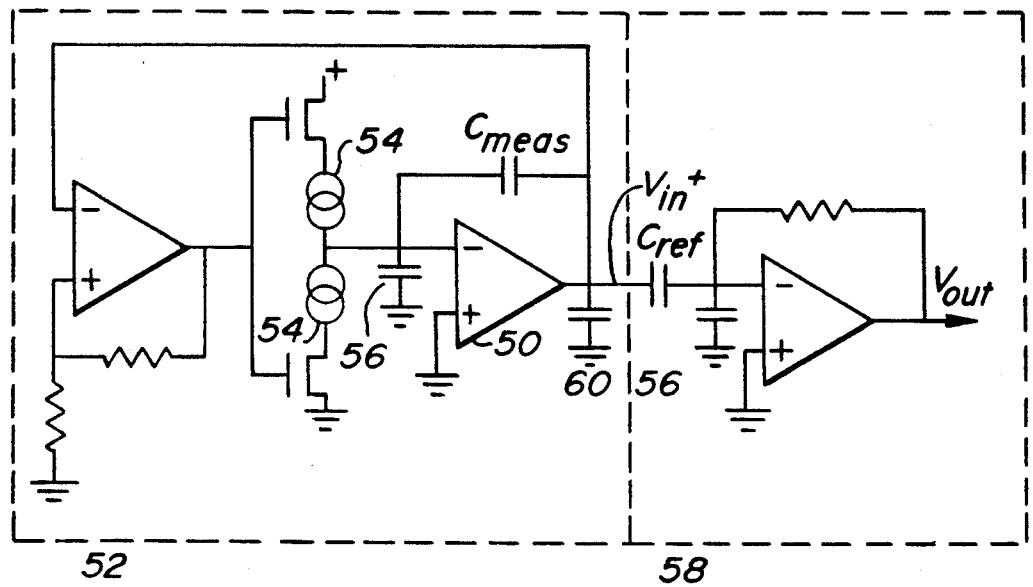
FIG. 5 is a schematic drawing of a second embodiment of integrated analog signal conditioning circuitry which may be deposited on the CMOS back plate of the present invention.

FIG. 5 shows a second embodiment of analog signal conditioning circuitry employing an integrator/differentiator technique. This circuit employs the well-known fact that an op-amp integrator multiplies its input by 1/RC while an op-amp differentiator multiplies its input by RC. $V_{out}$ is forced to be proportional to $C_{ref}/C_{meas}$ by employing an integrator, the output of which changes proportionally to $1/C_{meas}$, followed by a differentiator having an output proportional to $C_{ref}$. An input voltage signal is generated by incorporating an integrating op-amp circuit 50 into a simple relaxation oscillator circuit 52. Two current sources 54 are employed to set the charging current. $V_{int}$, the output of the integrator stage of the circuit, is presented to a differentiating stage 58 through $C_{ref}$. Thus, $V_{out}$ is a square wave having an amplitude proportional to $C_{ref}/C_{meas}$. The effects of stray capacitance 60 is minimized because it is driven by the low impedance output of the integrating op-amp 50. The stray capacitances 56 are minimized by connection to virtual grounds. Their values are reduced by a factor equal to the open loop gain of the amplifiers. It will be apparent to those skilled in the art that $V_{out}$ may be input to a peak detection circuit on a sample and hold to obtain a dc voltage proportional to the parameter being measured by the sensor.

Figure 6:
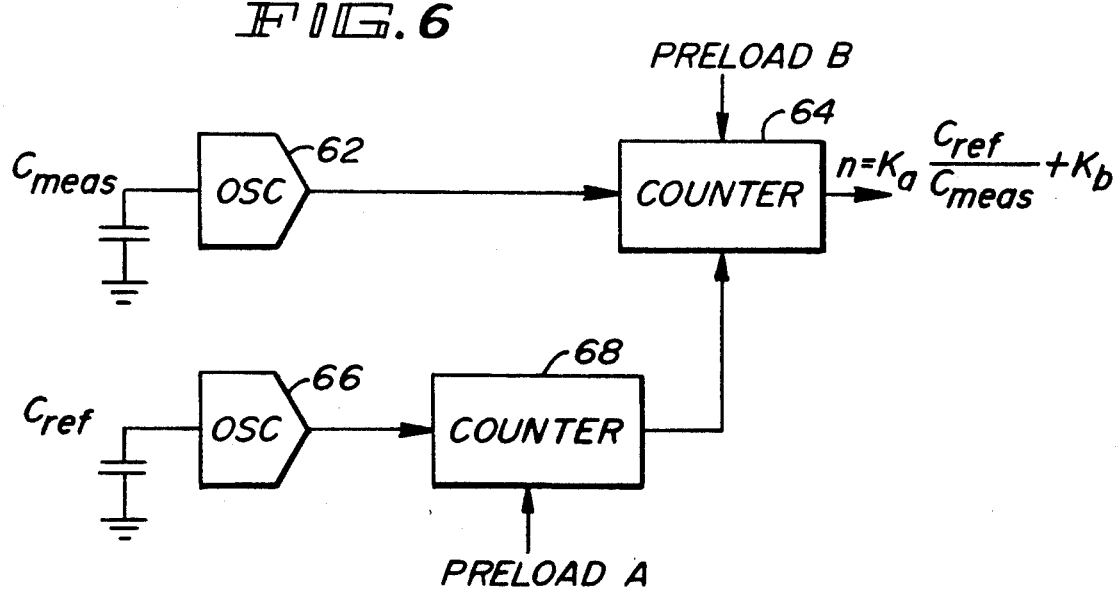
FIG. 6 is a schematic drawing of an embodiment of integrated digital signal conditioning circuitry which may be deposited on the CMOS back plate of the present invention.

FIG. 6 shows an embodiment of digital signal conditioning circuitry suitable for use with the present invention. In this embodiment, the diaphragm, as the common terminal of both the measured and reference capacitors, is grounded. This results in stray capacitances in parallel with the reference and measured capacitances. In order to minimize the effect of the strays, electrically conductive guard regions 33 are introduced directly below electrodes 28 and 30. These regions are of opposite polarity to the polarity of the base and therefor form a PN junction as illustrated.

Figure 7:
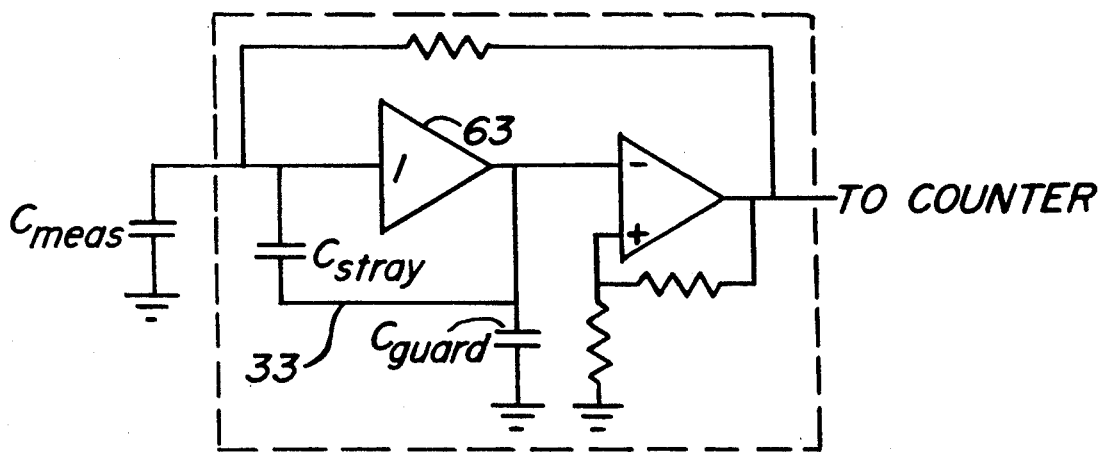
FIG. 7 is a schematic drawing of a relaxation oscillator suitable for use in the circuit of FIG. 6.
Figure 7A:
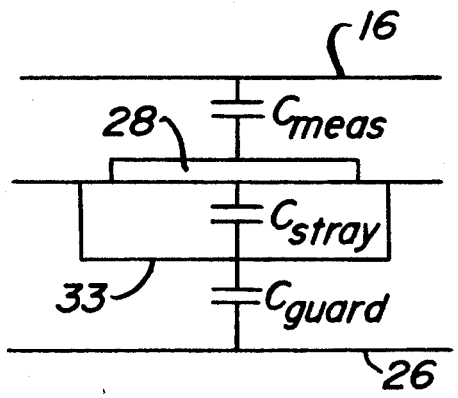
FIG. 7a is a schematic useful in understanding the effect of the guard region.

As shown in FIG. 7, these guard regions 33 are driven by a unity gain buffer amplifier 63 effectively removing $C_{stray}$ from the circuit. A relaxation oscillator incorporating this structure then is only responsive to the desired capacitance $C_{meas}$.

Specifically, with reference to FIGS. 6 and 7, a first oscillator 62 is constructed so that the output frequency is proportional to the reciprocal of $C_{meas}$. The output of the first oscillator 62 is connected to an input of counter 64 of the type commonly known in the art. A second oscillator 66 is constructed so that the output frequency is proportional to the reciprocal of $C_{ref}$. The output of the second oscillator 66 is connected to a counter 68, the purpose of which is to control the gating or integration time of the first counter The operation proceeds as follows. At the beginning of a cycle, counter 68 is preloaded with a value A and counter 64 is preloaded with a value B. Both counters accumulate counts from their respective oscillators for a period of time until counter 68 reaches zero. At this time, the value in counter 64 is transferred to external circuitry and the cycle is repeated. The value at the output is equal to $Ka*C_{ref}/C_{meas}+Kb$, where Ka and Kb are directly proportional to the preload values A and B, thus permitting simple adjustment of both the span and offset of the sensor. The circuitry of FIG. 6 allows a digital sensor output without costly and complex analog to digital conversion circuitry.

The present invention has been described with respect to certain embodiments and conditions, which are not meant to limit the invention. Those skilled in the art will understand that variations from the embodiments and conditions described herein may be made without departing from the invention as set forth in the appended claims.

What is claimed is:

1. A silicon-on-silicon capacitive device for sensing differential fluid pressure comprising:
   a) a silicon top plate having a first fluid port formed therein;
   b) a silicon base having conductive traces disposed thereon;
   c) a silicon diaphragm secured in a chamber defined between said base and said top plate, said diaphragm having a central portion that responds to external stimulus from said fluid, said diaphragm element having conductive portions corresponding to the traces on said base element to define a fixed, reference capacitor and a measured capacitor, which moves responsive to changes in fluid pressure to vary the capacitance thereof and;
   d) integrated circuit means deposited on said silicon base and electrically connected to said reference and measured capacitors for minimizing the effect of stray capacitance and for providing an output proportional to the ratio of the reference capacitance to measured capacitance.

2. The silicon-on-silicon sensing device of claim 1 wherein said silicon diaphragm includes portions defining a pressure stop, said pressure stop limiting the deflection of said diaphragm by abutting said top plate before said diaphragm is deflected enough to be damaged.

3. The device according to claim 1 wherein said reference and measured capacitors are surrounded by conductive guard regions of a polarity opposite to the polarity of the silicon base thereby to form a PN junction to isolate said capacitors from the base.

4. The silicon-on-silicon sensing device of claim 3 wherein said signal conditioning circuitry comprises:

a) a first oscillator for generating a waveform having a frequency proportional to said reference capacitance;
b) a second oscillator for generating a waveform having a frequency proportional to said measured capacitance, and;
c) counter means receiving the waveforms generated by the oscillators for producing said proportional output.

5. The device according to claim 4 wherein said first and second oscillators include means for substantially reducing the effect of stray capacitances formed by the interposition of said guard regions between the base and said measured and reference capacitors.

6. The silicon-on-silicon sensing device of claim 1 wherein said silicon diaphragm includes corrugated portions to enhance the linearity of the deflection of said diaphragm responsive to fluid entering said fluid port.

7. The silicon-on-silicon sensing device of claim 1 wherein the diaphragm and the base define a second fluid port for external fluid communication of the space between the diaphragm and base whereby the output is proportional to said measured capacitance and reflects the differential deflection of the diaphragm between stimulus from the first fluid port and the second fluid port.

8. The silicon-on-silicon sensing device of claim 1 wherein said signal conditioning circuitry comprises:
a) a gain stage for generating an analog voltage, which periodically is proportional to the ratio of said reference capacitance to said measured capacitance;
b) a sampling stage for receiving the analog voltage from said gain stage, and producing said output;
c) switch means for connecting said voltage to said sampling stage only when said voltage is proportional to said ratio.

9. The silicon-on-silicon sensing device of claim 1 wherein said signal conditioning circuitry comprises:
a) an integrator stage for generating a voltage proportional to said measured capacitance value, and;
b) a differentiator stage receiving said voltage and generating said output proportional to the ratio of said reference capacitance to said measured capacitance.

10. A method of forming a device for sensing differential fluid pressure comprising the steps of:
a) forming a silicon top plate having a fluid port therein;
b) forming a silicon base having three conductive areas deposited thereon to permit sensing of reference and measured capacitances;
c) depositing integrated signal conditioning circuitry on said base element connected to said conductive areas for producing an output signal proportional to the ratio of said reference and measured capacitances;
d) forming a silicon diaphragm element having a reduced-thickness portion which responds to differential fluid pressure, said diaphragm element having conductive areas corresponding to the conductive areas deposited on said base;
e) bonding said diaphragm element between said top plate and said base for movement within a chamber defined thereby, said conductive regions on said base and said diaphragm forming both a stationary, reference capacitor and a measured capacitor which moves responsive to changes in fluid pressure to vary the capacitance thereof.

* * * * *